United States Patent
Fong et al.

(10) Patent No.: US 12,021,805 B2
(45) Date of Patent: Jun. 25, 2024

(54) COLLABORATION SOFTWARE DEVELOPMENT KIT

(71) Applicant: Salesforce, Inc., San Francisco, CA (US)

(72) Inventors: Andrew Fong, Menlo Park, CA (US); Scott Goodfriend, Berkeley, CA (US)

(73) Assignee: Salesforce, Inc., San Francisco, CA (US)

( * ) Notice: Subject to any disclaimer, the term of this patent is extended or adjusted under 35 U.S.C. 154(b) by 55 days.

(21) Appl. No.: 17/566,947

(22) Filed: Dec. 31, 2021

(65) Prior Publication Data

US 2023/0216816 A1 Jul. 6, 2023

(51) Int. Cl.
*H04L 51/10* (2022.01)
*H04L 51/046* (2022.01)
*G06Q 10/10* (2023.01)

(52) U.S. Cl.
CPC ............ *H04L 51/10* (2013.01); *H04L 51/046* (2013.01); *G06Q 10/103* (2013.01)

(58) Field of Classification Search
CPC ....... H04L 51/04; H04L 51/046; H04L 51/56; H04L 67/53; H04L 51/00; H04L 63/10; H04L 63/102; H04L 63/108; H04L 67/306; G06Q 10/10; G06Q 10/101; G06Q 10/103; G06Q 10/107
See application file for complete search history.

(56) References Cited

U.S. PATENT DOCUMENTS

| | | |
|---|---|---|
| 6,008,804 A | 12/1999 | Pommier et al. |
| 7,913,178 B2 | 3/2011 | Gould et al. |
| 8,924,844 B2 | 12/2014 | Lynch |
| 9,418,388 B1 * | 8/2016 | Young .................... H04L 67/10 |
| 10,692,138 B1 * | 6/2020 | Nguyen ................ H04L 63/102 |
| 10,848,445 B1 | 11/2020 | Willmann |
| 11,256,387 B1 | 2/2022 | Huff et al. |
| 11,301,200 B2 | 4/2022 | Zhang et al. |
| 11,374,990 B2 | 6/2022 | Lansing et al. |
| 2004/0267871 A1 | 12/2004 | Pratley et al. |
| 2005/0132281 A1 | 6/2005 | Pan et al. |
| 2005/0193325 A1 | 9/2005 | Epstein |
| 2008/0183819 A1 | 7/2008 | Gould et al. |
| 2008/0229185 A1 | 9/2008 | Lynch |
| 2009/0157811 A1 | 6/2009 | Bailor et al. |
| 2009/0271696 A1 | 10/2009 | Bailor et al. |
| 2013/0080919 A1 | 3/2013 | Kiang et al. |
| 2013/0174032 A1 | 7/2013 | Tse et al. |

(Continued)

OTHER PUBLICATIONS

Karjoth, Günter. "The Authorization Service of Tivoli Policy Director." Seventeenth Annual Computer Security Applications Conference. IEEE, 2001. (Year: 2001).*

(Continued)

*Primary Examiner* — Vivek Srivastava
*Assistant Examiner* — William C McBeth
(74) *Attorney, Agent, or Firm* — Lee & Hayes, P.C.

(57) ABSTRACT

Systems, methods, and computer-readable media are provided for collaboration in a group-based communication system via a third-party integration. A new collaboration instance controller is initialized which allows the third-party integration to request and receive group-based communication system objects from the group-based communication system.

20 Claims, 7 Drawing Sheets

(56) References Cited

U.S. PATENT DOCUMENTS

| | | | | |
|---|---|---|---|---|
| 2013/0297680 | A1* | 11/2013 | Smith | H04L 51/10 709/217 |
| 2013/0318125 | A1* | 11/2013 | Smith | H04L 63/08 707/781 |
| 2013/0347070 | A1* | 12/2013 | Cairns | H04L 63/101 726/3 |
| 2014/0258972 | A1* | 9/2014 | Savage | G06F 9/451 717/106 |
| 2015/0358326 | A1* | 12/2015 | Varshney | G06Q 10/101 726/4 |
| 2016/0315995 | A1 | 10/2016 | Hausler et al. | |
| 2017/0063749 | A1 | 3/2017 | Gupta et al. | |
| 2017/0132200 | A1 | 5/2017 | Noland et al. | |
| 2017/0310771 | A1* | 10/2017 | Lewis | H04L 63/102 |
| 2018/0157390 | A1 | 6/2018 | Vas et al. | |
| 2018/0276053 | A1* | 9/2018 | Kesavan | H04L 67/53 |
| 2018/0287982 | A1 | 10/2018 | Draeger et al. | |
| 2019/0058680 | A1 | 2/2019 | Rosania et al. | |
| 2019/0098087 | A1 | 3/2019 | Johnston et al. | |
| 2019/0102472 | A1 | 4/2019 | Rensburg et al. | |
| 2019/0108241 | A1 | 4/2019 | Emerick et al. | |
| 2019/0166330 | A1 | 5/2019 | Ma et al. | |
| 2019/0179876 | A1 | 6/2019 | Zhang et al. | |
| 2019/0190863 | A1* | 6/2019 | Baker | G06Q 10/107 |
| 2019/0253430 | A1* | 8/2019 | Gamache | H04L 63/104 |
| 2020/0090135 | A1* | 3/2020 | Malcangio | H04L 67/53 |
| 2020/0279070 | A1 | 9/2020 | Rose et al. | |
| 2020/0293185 | A1* | 9/2020 | Shedigumme | G06F 16/903 |
| 2020/0348802 | A1 | 11/2020 | Brito et al. | |
| 2020/0387567 | A1 | 12/2020 | Loforte et al. | |
| 2021/0056184 | A1* | 2/2021 | Modani | H04L 63/101 |
| 2021/0075782 | A1* | 3/2021 | Dunjic | H04L 63/102 |
| 2021/0248556 | A1 | 8/2021 | Venkatraman et al. | |
| 2021/0397402 | A1 | 12/2021 | Ashkenazi et al. | |
| 2022/0078143 | A1* | 3/2022 | Eirinberg | H04L 51/10 |
| 2022/0086200 | A1 | 3/2022 | Lansing et al. | |
| 2022/0350896 | A1* | 11/2022 | Whitcomb | G06F 21/577 |
| 2022/0365740 | A1 | 11/2022 | Chang et al. | |
| 2023/0096672 | A1* | 3/2023 | Bhat | G06F 21/6245 726/27 |

OTHER PUBLICATIONS

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html> (dated May 28, 2014, 2:48 PM) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

U.S. Appl. No. 17/564,506, Final Office Action dated Feb. 3, 2023.
U.S. Appl. No. 17/589,584, Non-Final Office Action dated Jan. 20, 2023.
Hu, Vincent C. et al.; Attribute Considerations for Access Control Systems; NIST Special Publication 800-205; U.S. Department of Commerce; pp. 1-42; https://doi.org/10.6028/NIST.SP.800-205; retrieved on Aug. 24, 2022.
U.S. Appl. No. 17/589,692, Non-Final Office Action dated Jan. 18, 2023.
Malik et al. A Comparison of Collaborative Access Control Models, IJACSA 8:3, 2017, pp. 209-206. (2017).
U.S. Appl. No. 17/589,822, Non-Final Office Action dated Nov. 30, 2022.
U.S. Appl. No. 17/564,506, Non-Final Office Action dated Oct. 6, 2022.
PCT Patent Application PCT/US2022/052680 Written Opinion of the International Searching Authority and International Search Report dated Apr. 5, 2023.
U.S. Appl. No. 17/589,822, Final Office Action dated Mar. 23, 2023.
U.S. Appl. No. 17/564,506, Notice of Allowance dated Jun. 5, 2023.
U.S. Appl. No. 17/589,584, Notice of Allowance dated May 18, 2023.
U.S. Appl. No. 17/589,692, Final Office Action dated May 12, 2023.
Bertino et al. Specifying and enforcing access control policies for XML document sources. World Wide Web 3 (2000), pp. 139-151, 2000.

* cited by examiner

COLLABORATION SOFTWARE DEVELOPMENT KIT

TECHNICAL FIELD

Group-based collaboration systems allow users to interact and work collaboratively to provide high levels of efficiency and creativity. These group-based communication systems offer a variety of tools for synchronous and asynchronous work which allow organizations to work effectively both in person and remotely. However, these tools may be inaccessible to users outside of the group-based collaboration systems. Additionally, third-party integrations may provide tools not available within the group-based communication system which could benefit from access to objects within the group-based communication system. Accordingly, what is needed is a way to allow third-party integrations and other third-party applications and to securely access objects from the group-based communication system.

SUMMARY

Embodiments of the invention solve the above-mentioned problems by providing systems, methods, and computer-readable media for collaboration in a group-based communication system via a third-party integration. In some embodiments, the group-based communication system receives a request to initialize a collaboration instance controller from a third-party. This request may include configuration settings and information related to the access rights associated with a user of the group-based communication system, such as the user's login information for the group-based communication system. If the information is accepted, the group-based communication system may initialize the collaboration instance controller and provide it to the third party. Via the collaboration instance controller, the third party may request objects within the group-based communication system. If it is determined that the access rights provide access to the requested objects, the objects may be transmitted to the third party.

A first embodiment of the invention is directed to one or more non-transitory computer-readable media storing computer-executable instructions that, when executed by a processor, perform a method for collaboration in a group-based communication system via a integration, the method comprising receiving a first request to initialize a new collaboration instance controller from the integration, wherein the first request includes configuration settings and an indicia of access rights to objects associated with a user of the group-based communication system, initializing the new collaboration instance controller based on the configuration settings, receiving a second request from the integration for one or more group-based communication system objects associated with the user via the new collaboration instance controller, determining that the integration has permission to access the one or more group-based communication system objects based on the indicia of access rights, and transmitting to the integration the one or more group-based communication system objects.

A second embodiment of the invention is directed to a method for collaboration in a group-based communication system via a integration, the method comprising receiving a first request to initialize a new collaboration instance controller from the integration, wherein the first request includes configuration settings and an indicia of access rights to objects associated with a user of the group-based communication system, initializing the new collaboration instance controller based on the configuration settings, receiving a second request from the integration for one or more group-based communication system objects associated with the user via the new collaboration instance controller, determining that the integration has permission to access the one or more group-based communication system objects based on the indicia of access rights, and transmitting to the integration the one or more group-based communication system objects.

A third embodiment of the invention is directed to a system for collaboration in a group-based communication system via a integration, the system comprising a data store associated with the group-based communication system, and a processor programmed to perform a method for collaboration in a group-based communication system via a integration, the method comprising receiving a first request to initialize a new collaboration instance controller from the integration, wherein the first request includes configuration settings and an indicia of access rights to objects associated with a user of the group-based communication system, initializing the new collaboration instance controller based on the configuration settings, receiving a second request from the integration for one or more group-based communication system objects associated with the user via the new collaboration instance controller, determining that the integration has permission to access the one or more group-based communication system objects based on the indicia of access rights, and transmitting to the integration the one or more group-based communication system objects.

Additional embodiments of the invention are directed to a machine learning model for determining one or more suggested triggers for a user based on user activity within a group-based communication system, wherein the machine learning model is trained using historic user data associated with the group-based communication system. In some such embodiments, the training of the machine learning model may be updated periodically based on use of triggers and automated workflows within the group-based communication system such that the accuracy of the suggestions improves over time.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "group-based communication system" refers to a collaborative communication system used within an organization and is distinct from a conventional email system. In some embodiments, the group-based communication system is a channel-based platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference.

In some embodiments, the group-based communication system may include synchronous multimedia collaboration sessions. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some embodiments, synchronous multimedia collaboration sessions may be based around a particular topic, a particular channel, or a set of users, while in other embodiments, synchronous multimedia collaboration sessions may exist without being tied to any particular channel, topic or set of users. Synchronous multimedia collaboration sessions may be short, ephemeral sessions from which no data is persisted. Alternatively, in some embodiments, synchronous multimedia collaboration sessions may be recorded, transcribed, and/or summarized for later review. Members of a particular synchronous multimedia collaboration session can post messages within a messaging thread associated with that synchronous multimedia collaboration session that are visible to other members of that synchronous multimedia collaboration session together with other messages in that thread. The "multimedia" in a synchronous multimedia collaboration session may include any or all of audio, video, screen sharing, collaborative document editing, whiteboarding, co-programming or any other form of media. A synchronous multimedia collaboration session may be started for a particular channel or direct message conversation by one or more members of that channel or direct message conversation. For example, a user may start a synchronous multimedia collaboration session in a channel as a means of communicating with other members of that channel who are presently online. The user may have an urgent decision and want immediate verbal feedback from other members of the channel. Starting a synchronous multimedia collaboration session allows the user to start an immediate audio conversation with other members of the channel without requiring scheduling.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

Figure 1A:
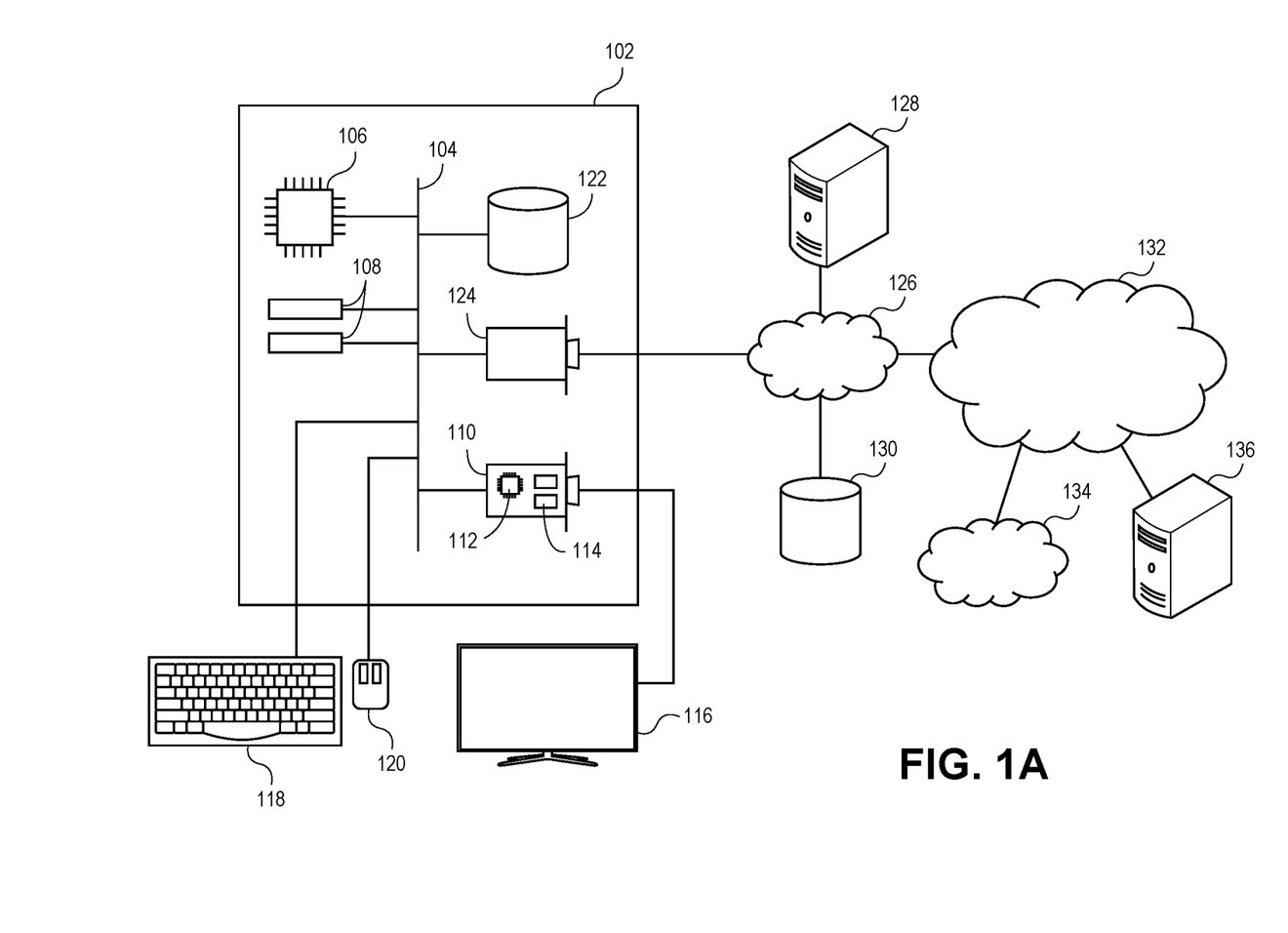
FIG. 1A depicts an exemplary hardware platform relating to certain embodiments of the invention.

FIG. 1A illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, BLUETOOTH, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functionality for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
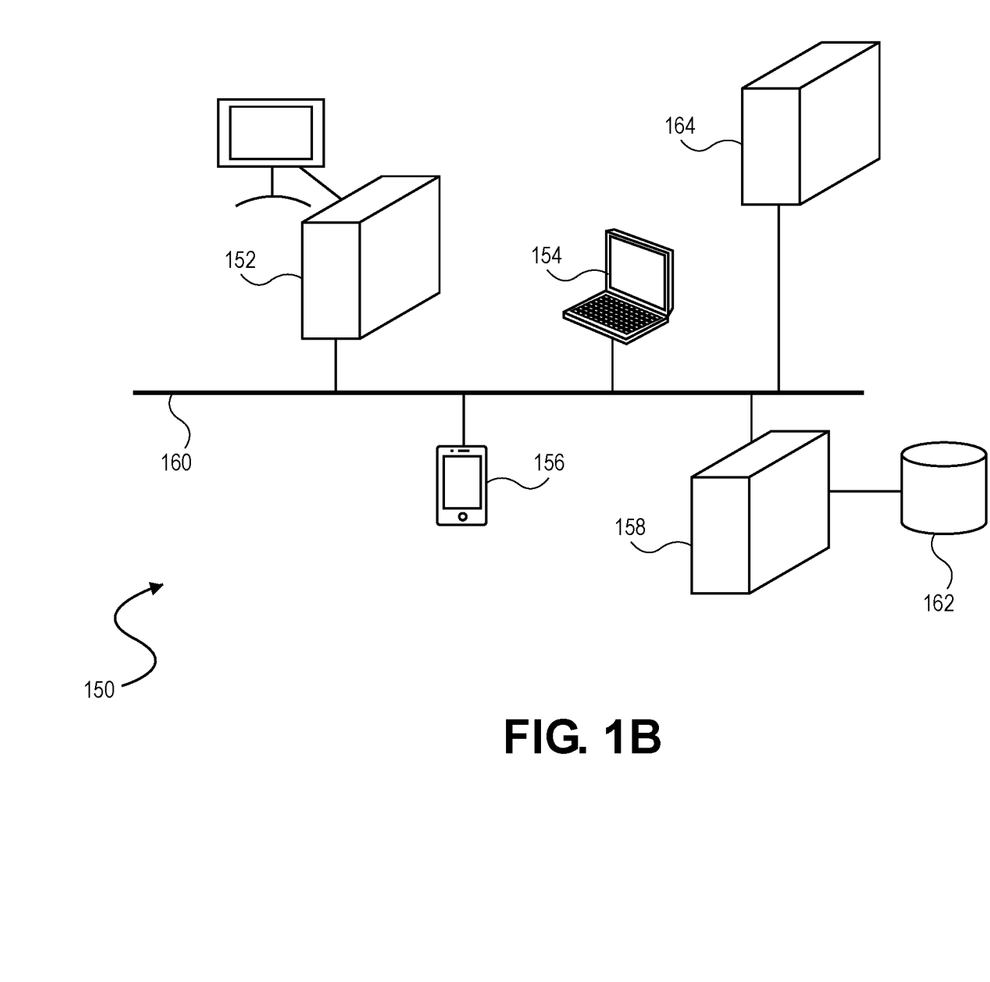
FIG. 1B depicts a system figure including elements for carrying out certain embodiments of the invention.

FIG. 1B shows a system figure including elements of a system 150 for carrying out certain embodiments of the invention. The system 150 comprises any number of client devices, such as client device 152, client device 154, and client device 156. As depicted in FIG. 1B, client devices may be any of a desktop computer, a laptop computer, a mobile phone, a tablet, or any other device suitable to allow a user to access the group-based communication system. The user may also switch from one client device to another and may access the group-based communication system via multiple devices simultaneously. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some examples, the group-based communication system is a channel-based platform having a plurality of messaging channels available to select users.

The system further comprises a group-based communication system server 158 that acts as a host for the group-based communication system. The group-based communication system server 158 may be a dedicated server, a shared server, or any other form of computing device discussed above with respect to FIG. 1A. Although a single group-based communication system server 158 is depicted, embodiments with multiple such group-based communication system servers are also contemplated so as to provide scale, redundancy and/or isolation between different instances of the group-based communication system. For example, a particular organization that uses the group-based communication system may not wish to have its group-based communications system hosted on the same server as a competitor's group-based communication system for security reasons. Group-based communication system server 158 is communicatively coupled to client devices 152, 154, and 156 via network 160. Network 160 may be a local area network (LAN), wide-area network (WAN), virtual private network (VPN) or the Internet. Broadly speaking, any type of network for providing communication between the various components of system 150 is contemplated. Group-based communication system server 158 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client applications are also contemplated.

It should be understood that the group-based communication system as referred to herein may provide a communication platform for a plurality of users. Wherein each user may be associated with a specific organization. Said specific organization may be a small business, a corporation, or the like, as well as any other group of users. The group-based communication system is operable to provide communication services to any combination of users. For example, in some embodiments, communication services can be provided for a plurality of users from a single organization, as well as a plurality of users from a plurality of organizations. In some embodiments, a plurality of channels is present within the group-based communication system. Users may be added to each channel, such that users within the channel have access to messages and files posted within the channel. Further, users within the channel have the ability to post messages and upload files within the channel. In some embodiments, users may be added to a particular channel by an administrator, such as an administrator within a particular organization. Alternatively, in some embodiments, users may be added by any user within the channel. Further, in some embodiments, channel parameters such as who can add users may be set by the channel creator. For example, channels created by a particular organization may follow that organization's security policy, in which only administrators can add users to certain channels.

Group-based communication system data store 162 is communicatively connected to group-based communication system server 158. As depicted, group-based communication system data store 162 is directly connected to group-based communication system server 158; however, any form of communicative connection (for example, network-attached storage (NAS), a network file system (NFS), or cloud-based storage) can be employed. Broadly speaking, group-based communication system data store 162 stores all of the information used by group-based communication system server 158. For example, group-based communication system data store 162 may store all of the messages with their associated channels, documents and images uploaded to particular channels, channel membership information, and/or user information. As previously discussed, multiple group-based communication system servers may be present in system 150. In such embodiments, each group-based communication system server may have its own copy of group-based communication system data store 162. Alternatively, multiple group-based communication system servers may share a single network-attached group-based communication system data store. Alternatively, or in addition, in any of these embodiments, data may be shared across multiple group-based communication system data stores.

The system further comprises a third-party integration server 164 that acts as a host for one or more third-party applications and/or third-party integrations (collectively, "third-party integrations" for brevity). While the term "third-party integration" is used for convenience in this Specification, third-party integrations may also be provided by the same party providing the group-based communication system. The third-party integration server 164 may be a dedicated server, a shared server, or any other form of computing device discussed above with respect to FIG. 1A. Although a single third-party integration server 164 is depicted, embodiments with multiple such third-party integration servers are also contemplated so as to provide scale, redundancy and/or isolation between different third-party integrations. Third-party integration server 164 is communicatively coupled to group-based communication system server 158 via network 160. Third-party integration server 164 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client applications are also contemplated.

It should be understood that any of the client devices 152, 154, and 156, and the group-based communication system server 158 may comprise a processor, such as CPU 106 described with respect to FIG. 1A. Any of the functionality described herein with respect to a processor may be carried out by the processors within any of these devices. In some embodiments, for example, a processor within the group-based communication system server may perform a first process step, while a processor within the client device performs a second process step.

Figure 2:
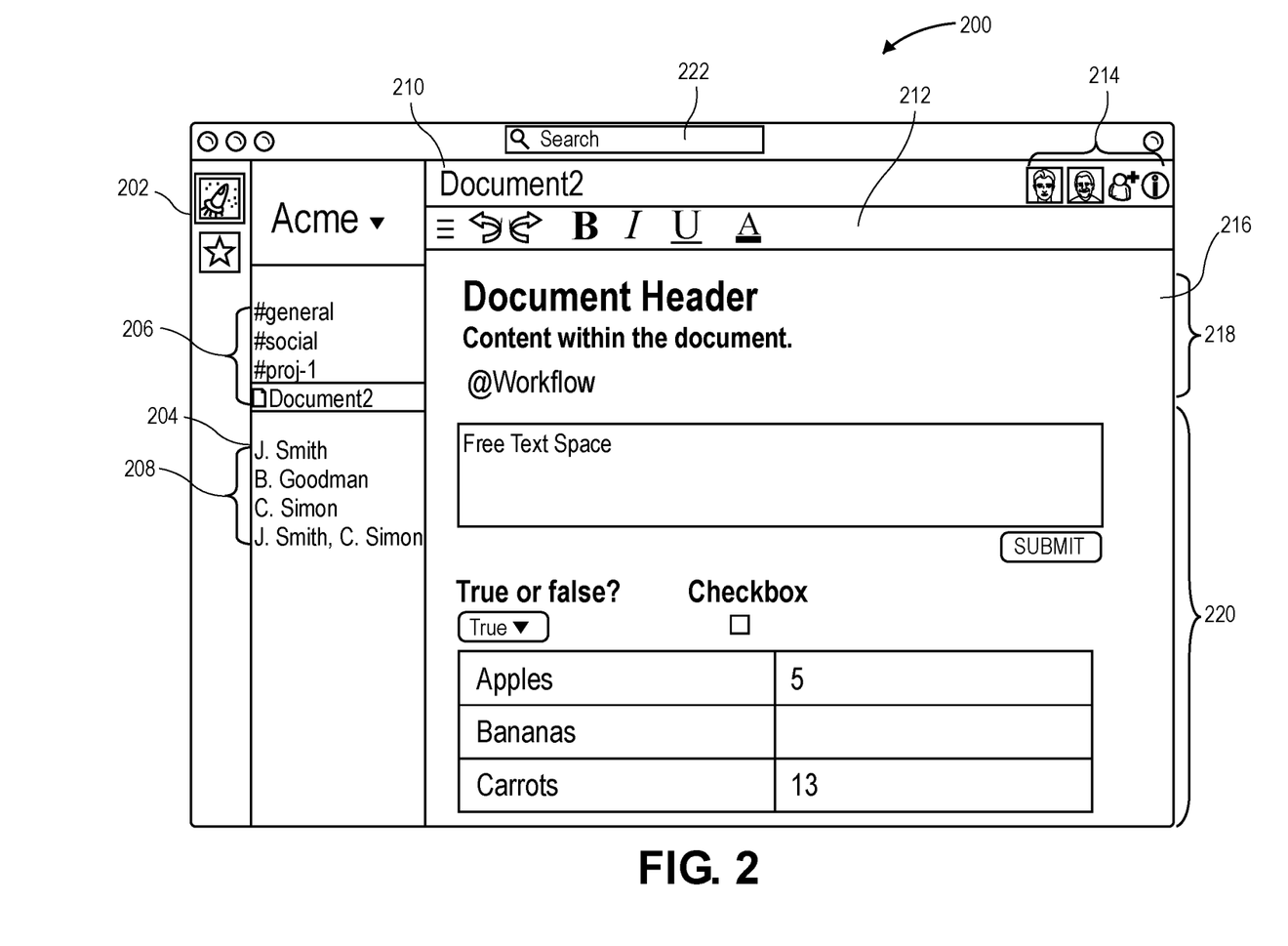
FIG. 2 depicts an exemplary embodiment of a user interface for the group-based communication system for displaying a document.

FIG. 2 illustrates an exemplary embodiment of a user interface for the group-based communication system. Parent window 200 is depicted which comprises a plurality of panes. As depicted, parent window 200 comprises workspace pane 202; channel list pane 204, which comprises channel and document list 206 and direct message list 208; document pane 210, which comprises document toolbar 212, document controls 214, and document display 216. In some embodiments, users can interact with the panes to navigate and utilize the various functions available within the group-based communication system.

As depicted, parent window 200 includes workspace pane 202 for navigating between various workspaces in the group-based communication system. In some embodiments, the group-based communication system can be portioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. For example, a user may be a part of a workspace for a job at Acme Software Development. The user may also be a member of a local volunteer organization that also uses the group-based communication system to collaborate. To navigate between the two groups, the user may use workspace pane 202 to change from the Acme workspace to the volunteer organization workspace. A workspace may comprise one or more channels that are unique to that workspace and/or one or more channels that are shared between one or more workspaces. For example, the Acme company may have a workspace for Acme software development projects, a workspace for Human Resources, and an additional workspace for general company matters. In some embodiments, workspaces can be associated with one or more organizations or other entities associated with the group-based communication system.

As depicted, parent window 200 further comprises document pane 210 that comprises information related to the current displayed document. In some embodiments, a group-based communication system channel pane (not depicted) is displayed together with document pane 210. In some embodiments, within the group-based communication system, documents may be modified and edited by one or more users. Users with the appropriate permissions and access can view, edit, or comment on the documents. Document pane 210 may comprise document toolbar 212, document controls 214, and document display 216. Document display 216 may display all of the content within the document including unstructured sections 218 and structured sections 220. The functionality of document editing pane 210 may be provided by the group-based communication system or by a third-party integration. Although a word-processing document is depicted in document editing pane 210, and type of document is contemplated for use with the invention, including spreadsheet editing, multimedia editing, image editing, and code editing, and each type of document editing may be provided by a different third-party integration. Channel list pane 204 may comprise a list of channels and documents to which the user has subscribed to or to which the user has been granted access or permissions to. Users can switch the currently displayed document to either another document, a channel, or a direct message by selecting another item in channel list pane 204.

In some embodiments, channel list pane 204 further includes direct message list 208. Direct message list 208 comprises a list of messages sent from a user directly to another user of the group-based communication system, called a direct message, and may be displayed in document pane 210 when selected. Direct messages may be sent to at least one other user. For example, the user may have a question for a manager, so the user may send a direct message to the manager asking the question. The manager may want to include another member of the group-based communication system in a response, so the manager may create a direct message group that includes the user and the other member of the group-based communication system. Direct messages may be sent to any number of users as multi-person direct messages. In some embodiments, direct messages can be sent to users within an organization, users outside of the organization, users of third-party applications, and/or any variety of users.

Document pane 210 may include document toolbar 212, which may display icons and menus which allow for the formatting of a document. For example, document toolbar 212 may provide a user the ability to bold, italicize, or underline fonts. In some embodiments, document toolbar 212 may provide users the ability to undo and redo actions. In further embodiments, document toolbar 212 may allow a user to modify the color of text. In still further embodiments, document toolbar 212 may allow a user to insert images, tables, and/or workflows. Document pane 210 may also display metadata for the currently selected document, including document name. Document pane 210 may also include document controls 214 for viewing members with access to the document, inviting a new member to the document, viewing information about the document, or other document-related functions. For example, document controls 214 may display icons indicating which users are currently viewing the document. In some embodiments, document pane 210 may display a workflow status which indicates which workflow step the workflow is currently on. For example, a workflow status may show that the document is currently in the process of an approval workflow step and the document is awaiting approval from a specific user. In further embodiments, the workflow status may show a summary of information within the workflow document. For example, the workflow document may include a table for users to insert their shirt size, and the workflow status may include a summary of the number of shirts of each size that were entered into the table.

Parent window 200 may also include search pane 222. Search pane 222 may allow users to search for content located in the current workspace of the group-based communication system. In some embodiments, the content searched may include documents. For example, a user may be looking for text within a document the user had previously accessed. In other embodiments, a user may search for meta content within the document, such as the name of workflows, workflow steps, or workflow tags, or the name of a user who created the document. The user may not remember which document the text was in, so the user may search for the text in search pane 222. In some embodiments, a user may only be able to search for documents that a user has permission to view. For example, if a document was not previously shared with a user, the document may not show up in the search results. In further embodiments, a user may have access to the document generally, but not to one or more specific sections of a document. In this instance, the user may only search based on content within the document that the user has permission to access. Users are not limited to searching within documents and may also search for messages, channels, members, and the like.

Document display 216 may display the selected document. In some embodiments, a user of the group-based communication system may edit the document if they have sufficient permissions. In further embodiments, a user of the group-based communication system may leave comments on the document. Documents may comprise free-form unstructured sections 218 and workflow-related structured sections 220. In some embodiments, unstructured sections 218 may include areas of the document in which a user can freely modify the document without any constraints. For example, a user may be able to freely type text to explain the purpose of the document. In some embodiments, a user may add a workflow by typing the name of or otherwise mentioning the workflow. In further embodiments, typing the at sign or a previously selected symbol or a previously determined special character or symbol may provide the user with a list of workflows which the user can select to add to the document. For example, a user may realize that a marketing team may need to sign off on a proposal and type "!Marketing Approval" to initiate a workflow which culminates in a member of the marketing team approving the proposal. In some embodiments, structured sections 220 may include text entry, selection menus, tables, checkboxes, tasks, calendar events, or any other document section. In further embodiments, structured sections may include text entry spaces which are a part of a workflow. For example, a user may enter text into a text entry space detailing a reason for approval, and then select a submit button which will advance the workflow to the next step of the workflow. In some embodiments, the user may be able to add, edit, or remove structured sections of the document that make up the workflow components.

Figure 3:
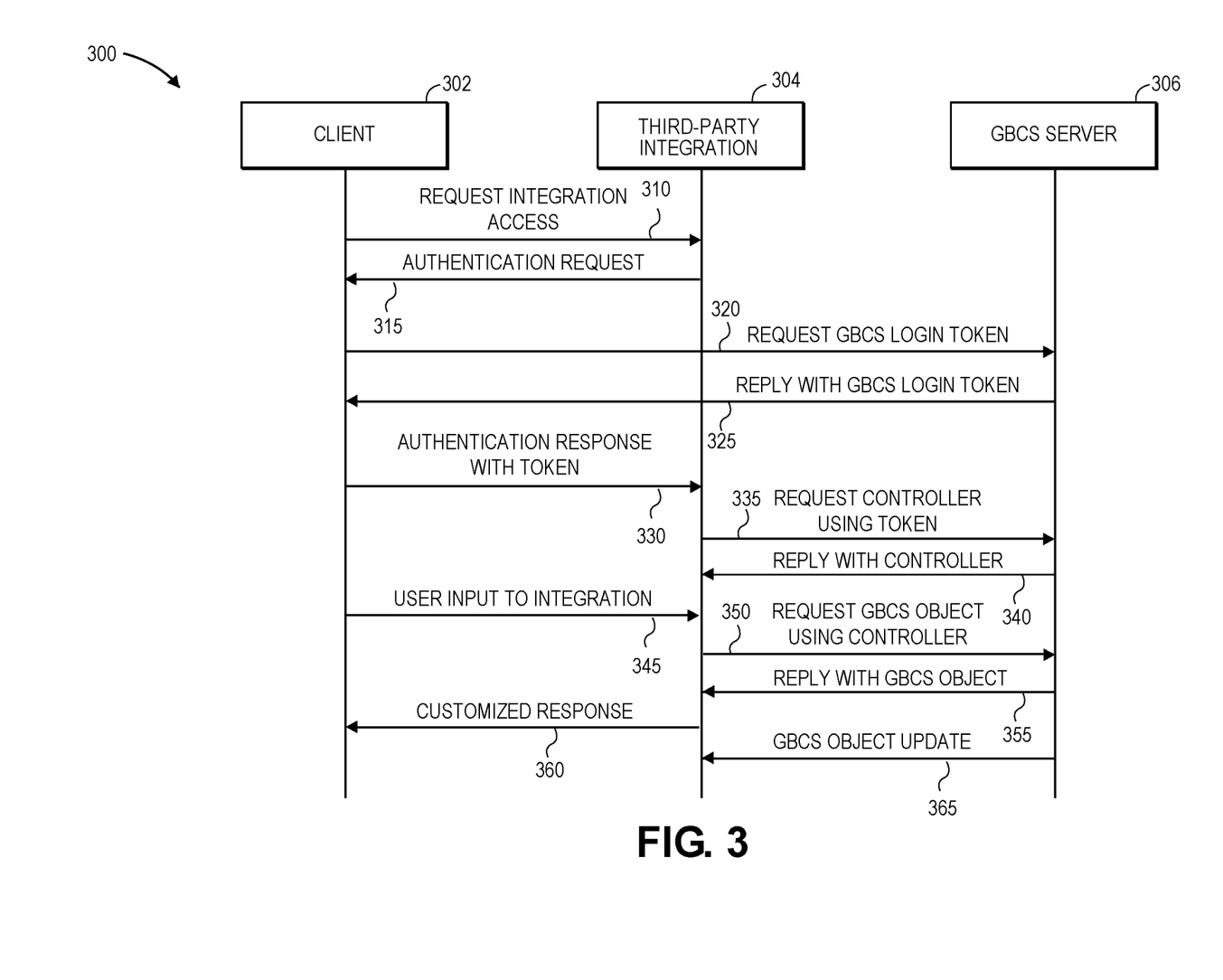
FIG. 3 depicts a system architecture relating to some embodiments of the invention.

FIG. 3 depicts a data flow diagram 300 depicting an exemplary communication protocol among elements of a system for carrying out certain embodiments of the invention. In some embodiments, the system may include client 302, third-party integration 304, and group-based communication system server 306. Client 302 may be a computer, mobile device, or any other means of accessing servers and applications. In some embodiments, third-party integration 304 may operate within client 302. In further embodiments, third-party integration 304 may operate remotely (for example, on a third-party server) and communicate with the client via a network such as local network 126 or Internet 132. Group-based communication system server 306 may host a group-based communication system, also as described above with respect to FIG. 2.

Initially, an authenticated client 302 may send message 310 including a request to access third-party integration 304, where the authentication protocol between client 302 and group-based communication system server 306 is not depicted but may take place before or after message 310 is sent. Message 310 requests that third-party integration 304 initiate an integration interface with group-based communication system server 306. Message 310 may be sent in response to a user selecting to initiate a third-party integration within group-based communication system server 306. In some embodiments, the user has previously authorized the third-party integration to access their data. For example, the user may have previously authorized the third-party integration to utilize the user's credentials and thus does not need to provide additional authorization. In some such embodiments, a long-lived authentication token is persisted by the third-party integration. In other embodiments, the access permission is stored by the group-based communication system server. In other embodiments, authorization occurs in response to the initiation of the integration controller. Such authorization by the user grants the third-party integration permission to access some or all group-based communication objects accessible to the user on their behalf. In response to message 310 requesting integration access, third-party integration 304 may reply with message 315 including an authentication request. Message 315 may ask for a user of client 302 to confirm that the user has appropriate access rights to the group-based communication system and/or request an authentication token allowing the third-party access to group-based communication system server 306 on the user's behalf. In some embodiments, the authentication token provides indicia (such as a manifest) of the set of objects to which access should be granted.

In response to message 315, client 302 may send message 320 including a request for a group-based communication system login token. In some embodiments, the user may include their login credentials that the user would ordinarily use to login to the group-based communication system. If message 320 is approved, the group-based communication system server 306 may send message 325 including a reply with a group-based communication system login token. In some embodiments, message 325 may be approved if the group-based communication system server 306 determines that the login credentials correspond to an active user of the group-based communication system. In further embodiments only select users of the group-based communication system may be permitted to access objects from within the group-based communication system through certain third-party applications. For example, the group-based communication system may approve requests from specific third-party applications which meet the security standards of the group-based communication system. In some embodiments, messages 320 and 325 may be omitted and client 302 may be able to generate an authentication token without communicating with group-based communication system server 306.

In response to receiving the group-based communication system login token, client 302 may provide authentication response 330 with the login token to the third-party integration 304. Using the login token, third-party integration 304 may send message 335 including a request for a controller using the login token to group-based communication system server 306. The controller may load data from third-party integration 304 and provide it to client 302, thereby permitting client 302 to access third-party data and UI controls provided by the third-party integration 304 without exposing the data of the group-based communication system directly. The controller can assist client 302 in rendering user interface objects associated with the third-party application such that the user interfaces rendered in the client are consistent with the user interfaces in the third-party integration. The controller also allows the client to leverage user interfaces provided by the third-party application so that the client does not have to implement its own version of the user interface associated with the third-party application. This is beneficial in reducing duplicate code that will need to be updated whenever the third-party integration code is updated. The controller can also assist client 302 in communication with third-party integration 304, such as assisting with configuration settings such that the configuration of the user interface rendered in the client is consistent with that of the third-party application. In some embodiments, message 335 may originate from client 302 and be sent to third-party integration 304. In further embodiments, the controller may be stored within client 302 directly. Message 335 may include the authentication information for a user of the group-based communication system and requests access rights for objects within the group-based communication system to which the user would ordinarily have access or to which the user has granted access. If the group-based communication system approves the request, it will send message 340 containing a reply with the controller back to third-party integration 304.

Once third-party integration 304 has an initialized controller, client 302 can proceed to interact with the third-party integration. Client 302 may send a message 345 including user input to the integration to third-party integration 304. For example, a user may wish to reference a channel from within the group-based communication system and input an identifier of the channel into a document on the third-party application. Third-party integration 304 may translate message 345 including user input to the integration into message 350 including a request for group-based communication system objects using the integration controller. For example, the third-party application may send a request for the list of all channels within the group-based communication system that correspond to a user's input and to which the user has (or has granted) access. Part or all of this list can then be provided in an autocomplete list, as shown below with respect to FIG. 4. Group-based communication system server 306 may send message 355 containing a reply indicating one or more group-based communication system objects. In some embodiments, group-based communication system server 306 may send the one or more group-based communication system objects which correspond to the user's input directly; in other embodiments, group-based communication system server 306 may instead send indicia of the objects (for example, names of matching channels). In other embodiments, the group-based communication system may send a renderable surface object to the third-party application. For example, a document editing integration may include its own user interface and functionality. By providing a renderable surface object to the third-party application, the third-party application can effectively be embedded within the group-based communication system without the need to re-implement the user interface and functionality within the group-based communication system. It is an advantage of such embodiments that the effort of duplicating code (and the attendant risk of introducing new bugs) is avoided. It is a further advantage that the third-party server can provide additional functionality, such as cloud storage, synchronization, and interoperability with other instances of the third-party application outside of the group-based communication system. In further embodiments, only group-based communication system objects which the user has access rights to may be included. Third-party integration 304 may provide message 360 as a customized response to client 302 providing for a customized user experience. For example, a JSON object indicating the names of matching objects may be sent to include in the dropdown depicted below with respect to FIG. 4. Message 360 may include data, instructions, or any other information needed to display or allow interaction with the group-based communication system inside of the third-party integration to the user of client 302. For example, the name of a channel may be displayed which when hovered over provides additional information about the channel, such as the number of users, when the channel was last updated, or any other information about the channel.

In some embodiments, if group-based communication system server 306 detects a change to the group-based communication system object that was previously provided to the third-party application, group-based communication system server 306 may proactively send message 365 including an update to the one or more group-based communication system objects previously sent. Message 365 may provide third-party integration 304 with instructions to update the group-based communication system object for display. For example, the group-based communication system object may be a user and the update may be an indication that the user has changed their status.

Figure 4:
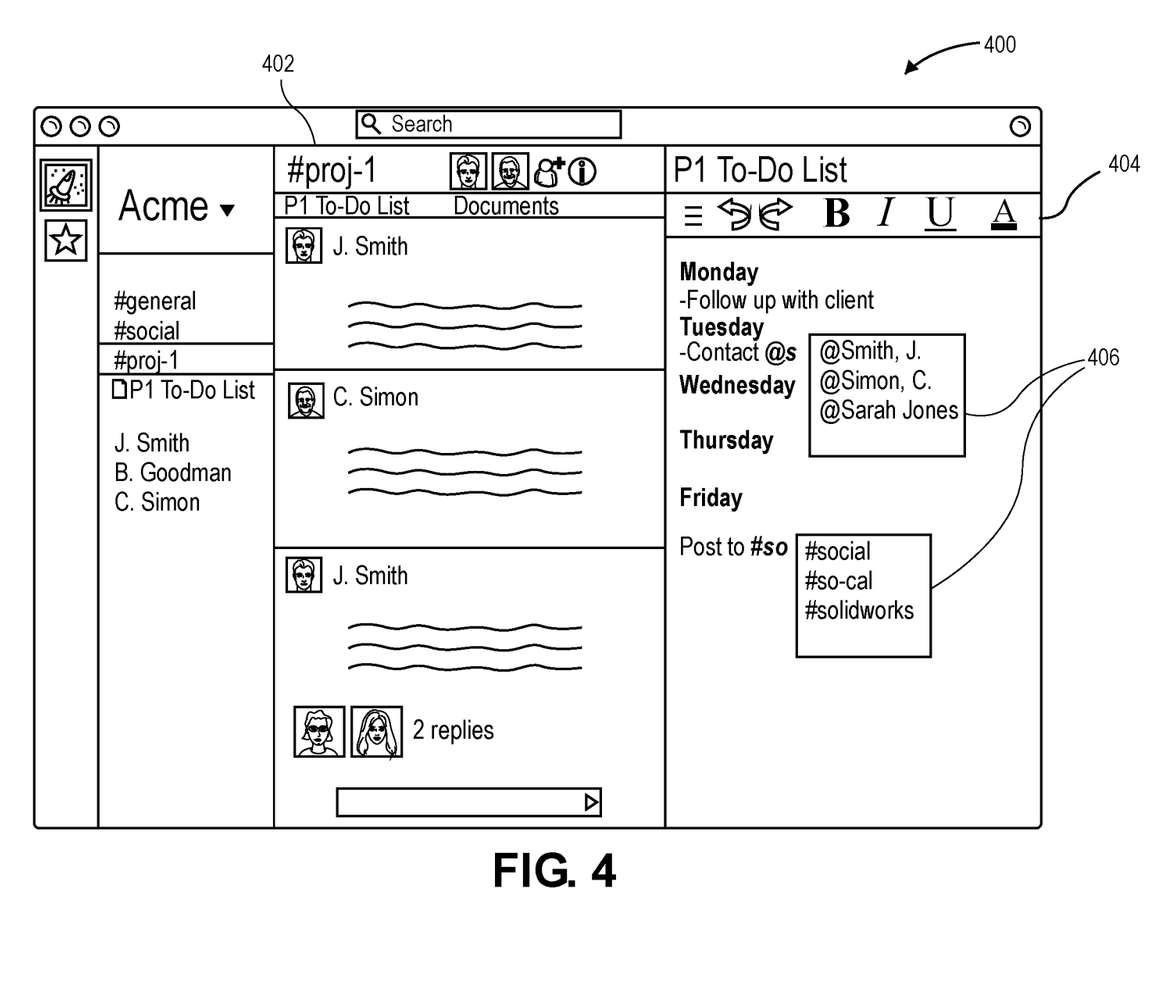
FIG. 4 depicts user interfaces relating to some embodiments of the invention.

FIG. 4 depicts user interfaces relating to some embodiments of the invention. User interface 400 is depicted which comprises a plurality of panes. As depicted, user interface 400 comprises channel pane 402 and third-party integration pane 404. Channel pane 402 comprises information related to the currently displayed channel. As discussed above, in some embodiments, within the group-based communication system, communication may be organized into "channels," each channel dedicated to a particular topic or set of users. Members of a particular channel can post messages within that channel that are visible to other members of that channel together with other messages in that channel. Users may select a channel for viewing in order to see only those messages relevant to the topic of that channel without seeing messages posted in other channels on different topics.

Third-party integration pane 404 comprises information related to a third-party integration. In some embodiments, the third-party integration may be incorporated into the group-based communication system. In further embodiments the third-party integration may be a separate stand-alone application. For example, a third-party application may be a document editor, a collaborative whiteboard, an infinite canvas design application, a ticketing system, or any other application usable by one or more users of the group-based communication system.

As described above, it is desirable for the third-party integration to be able to provide a user experience customized for the user. As such, when the user first accesses the third-party integration, it may create a controller as described above with respect to FIG. 3. Using that controller, the third-party integration can leverage the set of group-based communication system objects to which the user has access.

For example, if (as depicted) the third-party integration is a document editing platform, third-party applications may allow autocomplete functionality for group-based communication system objects. For example, if a user of the third-party application starts typing an identifier (such as a username or a channel name, as depicted) for a group-based communication system object, autocomplete box 406 may pop up to display possible options for the user to select. In some embodiments, the user of the third-party integration may select an option in autocomplete box 406 to select the group-based communication system object. In further embodiments, only group-based communication system objects that the user has permission to access may appear in autocomplete box 406.

Similarly, the third-party integration may display information from the group-based communication system such as channels, emojis, files, documents workflows, or users. For example, in some embodiments, the third-party application may display information such as the username of a user. In some such embodiments, clicking on the name of a channel or user in the third-party integration, may cause that channel or a direct messaging interface with that user to be displayed channel pane 402. For example, if the third-party integration is a ticketing system, then the user may be able to click on the name of the user reporting the ticket to initiate a direct messaging conversation with them. In further embodiments, hovering over the name of the user may display the status of the user.

In still further embodiments, the third-party application may display group-based communication system objects the same way as the group-based communication system displays objects natively. For example, users may embed group-based communication system messages, threads, or other objects in a document being edited. For example, continuing the example above of a ticketing system, a user might embed a direct-messaging conversation with a reporting user directly into a ticket for future reference. As described above, the user may be then able to continue that conversation directly from the third-party integration if desired. Broadly speaking, embodiments of the invention contemplate providing third-party integrations access to any operation of any group-based communication system object.

Figure 5:
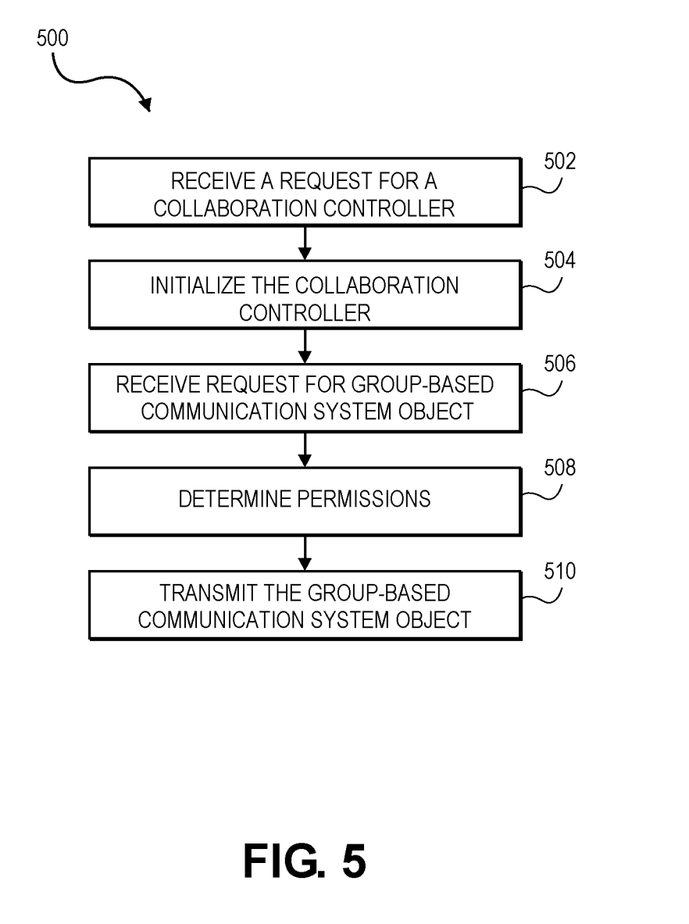
FIG. 5 depicts a flowchart relating to some embodiments of the invention.

FIG. 5 depicts an exemplary flowchart illustrating the operation of a method 500 for collaboration between a group-based communication system and a third-party application. In some embodiments, method 500 enables a third-party integration to communicate with a group-based communication system and access objects from within the group-based communication system. At step 502, a request for a collaboration controller is received. In some embodiments, the request may be received at a group-based communication system server and originate from a third-party server corresponding to a third-party integration. For example, a third-party integration may be a web-based application which involves creating and editing documents, and a user of the web-based application may wish to insert information from a group-based communication system into a document. In some embodiments, the request for a collaboration controller may include configuration settings. For example, the request may include information related to how the collaboration controller should be displayed, such as whether or not the collaboration controller should be displayed in light mode, dark mode, and/or in high contrast mode. In further embodiments, an authorization token may be included in the request. For example, an authenticated user of the group-based communication system may request and receive a login token to the group-based communication system which verifies the user, and which the user can provide to the third-party server to authorize the third-party server to access that user's objects on their behalf.

At step 504, the collaboration controller is initialized. In some embodiments, the collaboration controller may remain at the third-party integration. In further embodiments, the collaboration controller may be transmitted to the user (as, for example, JavaScript or other client-side code). The collaboration controller may enable the user to obtain information from the group-based communication system. In some embodiments, the collaboration controller may function for a predetermined amount of time, as controlled by the authentication token. In further embodiments, the amount of time the collaboration controller functions may be determined based on the third-party integration. For example, a third-party integration may be thought of as more secure such that the group-based communication system allows the collaboration controller to function for a longer period of time. In some embodiments, the collaboration controller may automatically be reset if the user has the appropriate permissions.

At step 506, a request for a group-based communication system object is received. In some embodiments, the request may be for more than one group-based communication system object. In some embodiments, a URL or other globally unique identifier for a group-based communication system object is received. In further embodiments, the request may be a partial request for a group-based communication system object. For example, the user may not know the name of the object and may start typing part of the name with the expectation that they will be provided with auto-complete results. In some embodiments, the request includes information related to the user who is requesting the object. For example, the request may include information related to the permissions of the user's account on the group-based communication system. In some embodiments, the request for an object may be sent via keyboard shortcuts.

At step 508, permissions for the one group-based communication system object are determined. In some embodiments, the permissions are determined based in part on the group-based communication system account of the user requesting the object. For example, if a user would have access to the object on the group-based communication system, then the user will be granted permission to retrieve the object. In further embodiments, permissions may vary based on how the user is requesting access to the object. For example, a channel within the group-based communication system may contain sensitive information such that the channel is set to not allow sharing to third-party integrations.

At step 510, the group-based communication system object is transmitted. In some embodiments, the group-based communication system object is sent from the group-based communication system to the third-party integration. The group-based communication system object may be transmitted as information related to the object or as a pointer to the object. In some embodiments, multiple group-based communication system objects may be transmitted. In further embodiments, a listener may be transmitted with the group-based communication system object such that the group-based communication system object may be automatically updated within the third-party integration if any changes are made to the object from within the group-based communication system. For example, the group-based communication system object may be a user who later changes their status. This status update may be automatically transmitted to the third-party integration such that the new status will appear within the third-party integration.

Figure 6:
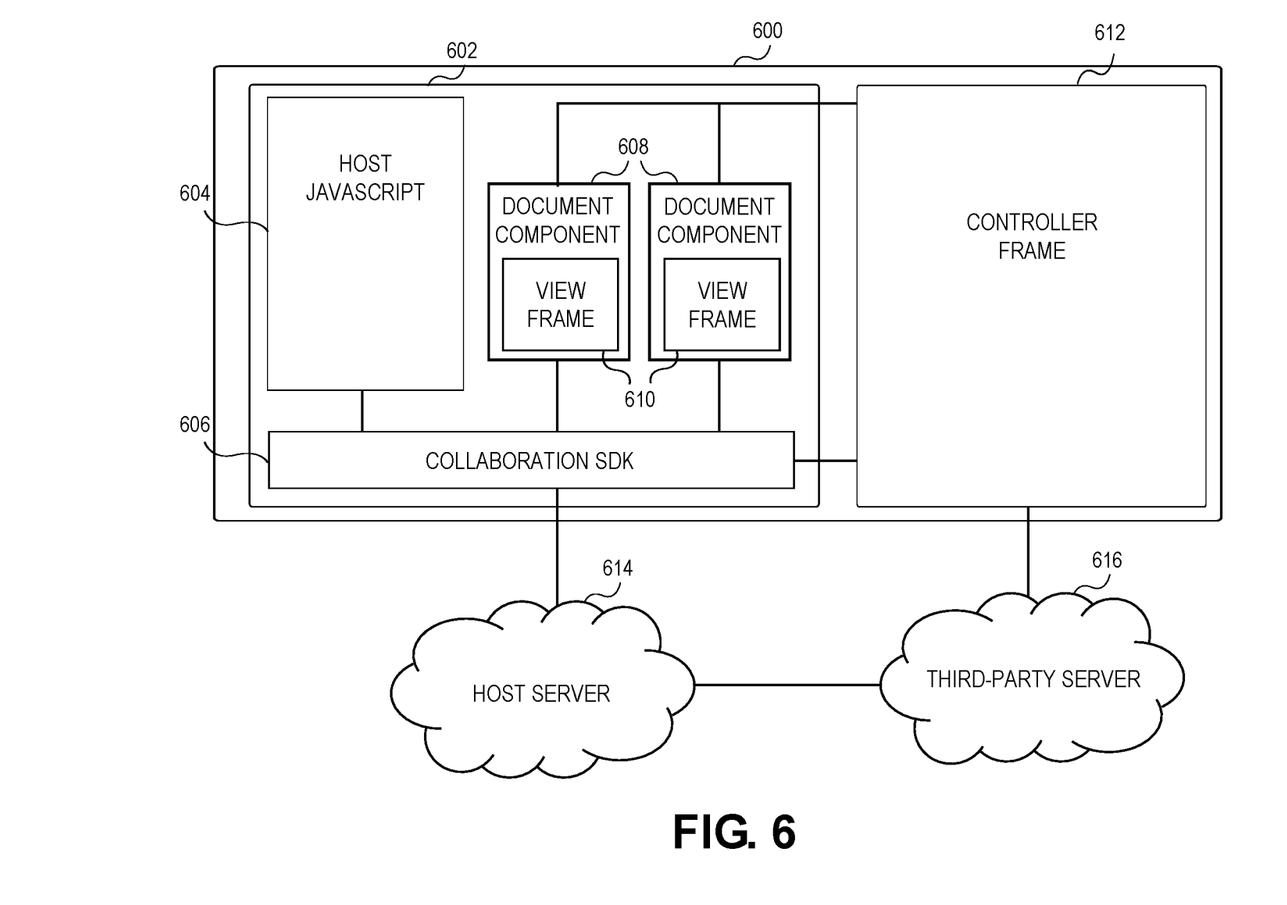
FIG. 6 depicts an exemplary system architecture diagram.

FIG. 6 depicts an exemplary system architecture diagram for carrying out some embodiments of the invention. Client 600 is depicted which may be a computer, mobile device, or any other means of accessing servers and applications. Client 600 may communicate with host server 614 and third-party server 616. In some embodiments, client 600 may contain host page 602 and controller frame 612. Host page 602 is referred to herein as a "page" for brevity but embodiments where host page 602 is a host frame instead are also contemplated. Host page 602 provides further benefits of the invention by allowing for complex user interfaces from third-party applications to be embedded within host frame 602. For example, as depicted, one or more view frames 610 are embedded as iframes in host page 602 and passed to the controller as a rendering surface. This avoids the complexity required for embedding complex user interfaces and user interface elements directly into the host page 602 and having to deal with JavaScript encapsulation issues, Cascading Style Sheets issues, and general issues of interoperability that are involved if the user interface is incorporated directly into host page 602. Such an approach also provides a consistent user interface for the third-party application consistent with implementations outside of the group-based communication system. In some embodiments, host page 602 may contain host JavaScript 604, collaboration SDK 606, and document component 608. Host page 602 may be part of or embedded within a group-based communication system.

In some embodiments, host JavaScript 604 may be used to display the standard group-based communication system components. Host JavaScript 604 may interface with collaboration SDK 606 to coordinate displaying of document component 608. In some embodiments, collaboration SDK 606 may communicate with host server 614 (which may, in some embodiments, be group-based communication system server 158) to acquire and store an authorization token in client 600. In further embodiments, collaboration SDK 606 communicates with document component 608 to coordinate the display. In further still embodiments, collaboration SDK 606 may communicate with multiple document components 608 simultaneously. Collaboration SDK 606 may also communicate with controller frame 612 to coordinate the settings and configurations of information coming from third-party server 616. In some embodiments, collaboration SDK 606 may include a platform delegate interface provided by client 600 to allow for the overriding of behavior that client 600 may want more control over. For example, a platform delegate may allow for additional functionality specific to client 600 such as interaction with users of client 600, including functionality which requires cooperation from client 600, such as navigation.

In some embodiments, document component 608 may contain view frame 610. View frame 610 may directly render user interface elements such that they may be natively embedded within document component 608. In some embodiments, view frame 610 may be an iframe that client 600 uses as a rendering surface. View frame 610 may communicate directly with controller frame 612 to determine how the user interface and related components should be rendered. In some embodiments, elements from client 600 may be displayed within view frame 610. View frame 610 may be customized and configured based on collaboration SDK 606. For example, the user interface may be rendered to correspond to other user interface elements displayed within client 600. In some embodiments, view frame 610 is not exposed to client 600 directly.

Third-party server 616 provides external functionality to the third-party integration 304. For example, third-party server 616 may simply provide the HyperText Markup Language (HTML) and JavaScript (JS) code for the embedded iframe. Alternatively, third-party server 616 may provide other functionality. For example, where the third-party application is a document editing platform, third-party server 616 may provide functionality such as cloud storage, collaborative document editing, and document synchronization by communicating with third-party integration 304. In some embodiments, third-party server 616 may communicate directly with host server 614. For example, host server 614 and third-party server 616 may communicate to check or update access control lists, such as determining whether or not certain users have the appropriate permissions to access certain resources. Third-party server 616 may also communicate with controller frame 612. In some embodiments, controller frame 612 may exist within client 600 and act as the primary means for communicating with third-party server 616. For example, third-party server 616 may push changes to controller frame 612 via a web socket while controller frame 612 may load data into third-party server 616. Changes that a user makes within view frame 610 may be communicated to third-party server 616 to store changes to data, or to otherwise backup data in a safe and secure location. In some embodiments, documents created within client 600 using collaboration SDK 606 may be stored natively within third-party server 616.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for collaboration in a group-based communication system via a third-party integration, the method comprising:
   receiving a first request to initialize a new collaboration instance controller from the third-party integration,
      wherein the first request includes configuration settings and an indicia of access rights to objects maintained by the group-based communication system, and
      wherein the indicia of access rights are in part based on access rights of a user of the group-based communication system with respect to individual ones of the objects;
   initializing the new collaboration instance controller based on the configuration settings;
   receiving a second request from the third-party integration for one or more group-based communication system objects associated with the user via the new collaboration instance controller, the second request including one or more object identifiers associated with the one or more group-based communication system objects, and the new collaboration instance controller is to function for a predetermined period of time that is based on at least one of the third-party integration or an authentication token;
   determining that the third-party integration has permission to access the one or more group-based communication system objects based on the indicia of access rights and the one or more object identifiers; and
   transmitting to the third-party integration the one or more group-based communication system objects.

2. The non-transitory computer-readable media of claim 1, wherein the third-party integration allows one or more third-party objects to be natively displayed within the group-based communication system.

3. The non-transitory computer-readable media of claim 1, wherein the one or more group-based communication system objects are channels, workspaces, users, files, or emojis.

4. The non-transitory computer-readable media of claim 1, wherein the third-party integration executes within a client of the group-based communication system.

5. The non-transitory computer-readable media of claim 1, wherein the one or more group-based communication system objects includes a document, and wherein transmitting to the third-party integration further includes instructions for natively displaying the document.

6. The non-transitory computer-readable media of claim 1, wherein the first request to initialize the new collaboration instance controller further includes an authorization token, and wherein initializing the new collaboration instance controller is further based on validating the authorization token.

7. The non-transitory computer-readable media of claim 1, further comprising:
   detecting an update to at least one of the one or more group-based communication system objects; and
   transmitting the update to the at least one of the one or more group-based communication system objects to the third-party integration.

8. A method for collaboration in a group-based communication system via a third-party integration, the method comprising:
   receiving a first request to initialize a new collaboration instance controller from the third-party integration,
   wherein the first request includes configuration settings and an indicia of access rights to objects maintained by the group-based communication system, and
   wherein the indicia of access rights are in part based on access rights of a user of the group-based communication system with respect to individual ones of the objects;
   initializing the new collaboration instance controller based on the configuration settings;
   receiving a second request from the third-party integration for one or more group-based communication system objects associated with the user via the new collaboration instance controller, the second request including one or more object identifiers associated with the one or more group-based communication system objects, and the new collaboration instance controller is to function for a predetermined period of time that is based on at least one of the third-party integration or an authentication token;
   determining that the third-party integration has permission to access the one or more group-based communication system objects based on the indicia of access rights and the one or more object identifiers; and
   transmitting to the third-party integration the one or more group-based communication system objects.

9. The method of claim 8, wherein the third-party integration allows one or more third-party objects to be natively displayed within the group-based communication system.

10. The method of claim 8, wherein the one or more group-based communication system objects are channels, workspaces, users, files, or emojis.

11. The method of claim 8, wherein the third-party integration executes within a client of the group-based communication system.

12. The method of claim 8, wherein the one or more group-based communication system objects includes a document, and wherein transmitting to the third-party integration further includes instructions for natively displaying the document.

13. The method of claim 8, wherein the first request to initialize the new collaboration instance controller further includes an authorization token, and wherein initializing the new collaboration instance controller is further based on validating the authorization token.

14. The method of claim 8, further comprising:
   detecting an update to at least one of the one or more group-based communication system objects; and
   transmitting the update to the at least one of the one or more group-based communication system objects to the third-party integration.

15. A system for collaboration in a group-based communication system via a third-party integration, the system comprising:
   a data store associated with the group-based communication system; and
   a processor programmed to perform a method for collaboration in the group-based communication system via the third-party integration, the method comprising:
      receiving a first request to initialize a new collaboration instance controller from the third-party integration,
      wherein the first request includes configuration settings and an indicia of access rights to objects maintained by the group-based communication system, and
      wherein the indicia of access rights are in part based on the access rights of a user of the group-based communication system with respect to individual ones of the objects;
      initializing the new collaboration instance controller based on the configuration settings;
      receiving a second request from the third-party integration for one or more group-based communication system objects associated with the user via the new collaboration instance controller, the second request including one or more object identifiers associated with the one or more group-based communication system objects, and the new collaboration instance controller is to function for a predetermined period of time that is based on at least one of the third-party integration or an authentication token;
      determining that the third-party integration has permission to access the one or more group- based communication system objects based on the indicia of access rights and the one or more object identifiers; and
      transmitting to the third-party integration the one or more group-based communication system objects.

16. The system of claim 15, wherein the third-party integration allows one or more third-party objects to be natively displayed within the group-based communication system.

17. The system of claim 15, wherein the third-party integration executes within a client of the group-based communication system.

18. The system of claim 15, wherein the one or more group-based communication system objects includes a document, and wherein transmitting to the third-party integration further includes instructions for natively displaying the document.

19. The system of claim 15, wherein the first request to initialize the new collaboration instance controller further includes an authorization token, and wherein initializing the new collaboration instance controller is further based on validating the authorization token.

20. The system of claim 15, wherein the method further comprises:
   detecting an update to at least one of the one or more group-based communication system objects; and
   transmitting the update to the at least one of the one or more group-based communication system objects to the third-party integration.

* * * * *